(12) United States Patent
Joo

(10) Patent No.: US 11,499,988 B2
(45) Date of Patent: Nov. 15, 2022

(54) PARAMETER ESTIMATING METHOD BASED ON CORRECTION OF INDEPENDENCE OF ERROR TERM, COMPUTER PROGRAM FOR IMPLEMENTING THE SAME METHOD, AND SYSTEM CONFIGURED TO PERFORM THE SAME METHOD

(71) Applicant: Si Hyung Joo, Gwangju (KR)

(72) Inventor: Si Hyung Joo, Gwangju (KR)

(*) Notice: Subject to any disclaimer, the term of this patent is extended or adjusted under 35 U.S.C. 154(b) by 0 days.

(21) Appl. No.: 17/204,212

(22) Filed: Mar. 17, 2021

(65) Prior Publication Data
US 2021/0293848 A1  Sep. 23, 2021

(30) Foreign Application Priority Data
Mar. 18, 2020 (KR) .......................... 10-2020-0033460

(51) Int. Cl.
*G01P 21/02* (2006.01)
*G06F 17/18* (2006.01)

(52) U.S. Cl.
CPC .............. *G01P 21/02* (2013.01); *G06F 17/18* (2013.01)

(58) Field of Classification Search
CPC .................................. G01P 21/02; G06F 17/18
See application file for complete search history.

(56) References Cited

FOREIGN PATENT DOCUMENTS

KR  10-2000-0058902 A   10/2000
KR  20090109247 A   * 10/2009

OTHER PUBLICATIONS

Zeckhauser et al., "Linear Regression with Non-Normal Error Terms" The Review of Economics and Statistics , Aug. 1970, vol. 52, No. 3 (Aug. 1970), pp. 280-286 (Year: 1970).*

* cited by examiner

*Primary Examiner* — John C Kuan
(74) *Attorney, Agent, or Firm* — Paratus Law Group, PLLC

(57) ABSTRACT

Disclosed are a parameter estimating method based on correction of independence of an error term, a computer program implementing the method, and a system configured to perform the method. The method includes: acquiring a measured velocity, which is a velocity of a moving object measured with a speedometer being operated by an observer and having a specific measurement unit, and an actual velocity of the moving object with respect to the observer; performing modeling of a linear regression model with the measured velocity as a dependent variable and the actual velocity of the moving object with respect to the observer as an independent variable; and estimating parameters of a linear regression equation after correcting the independence of the error term based on Lorentz velocity transformation.

12 Claims, 4 Drawing Sheets

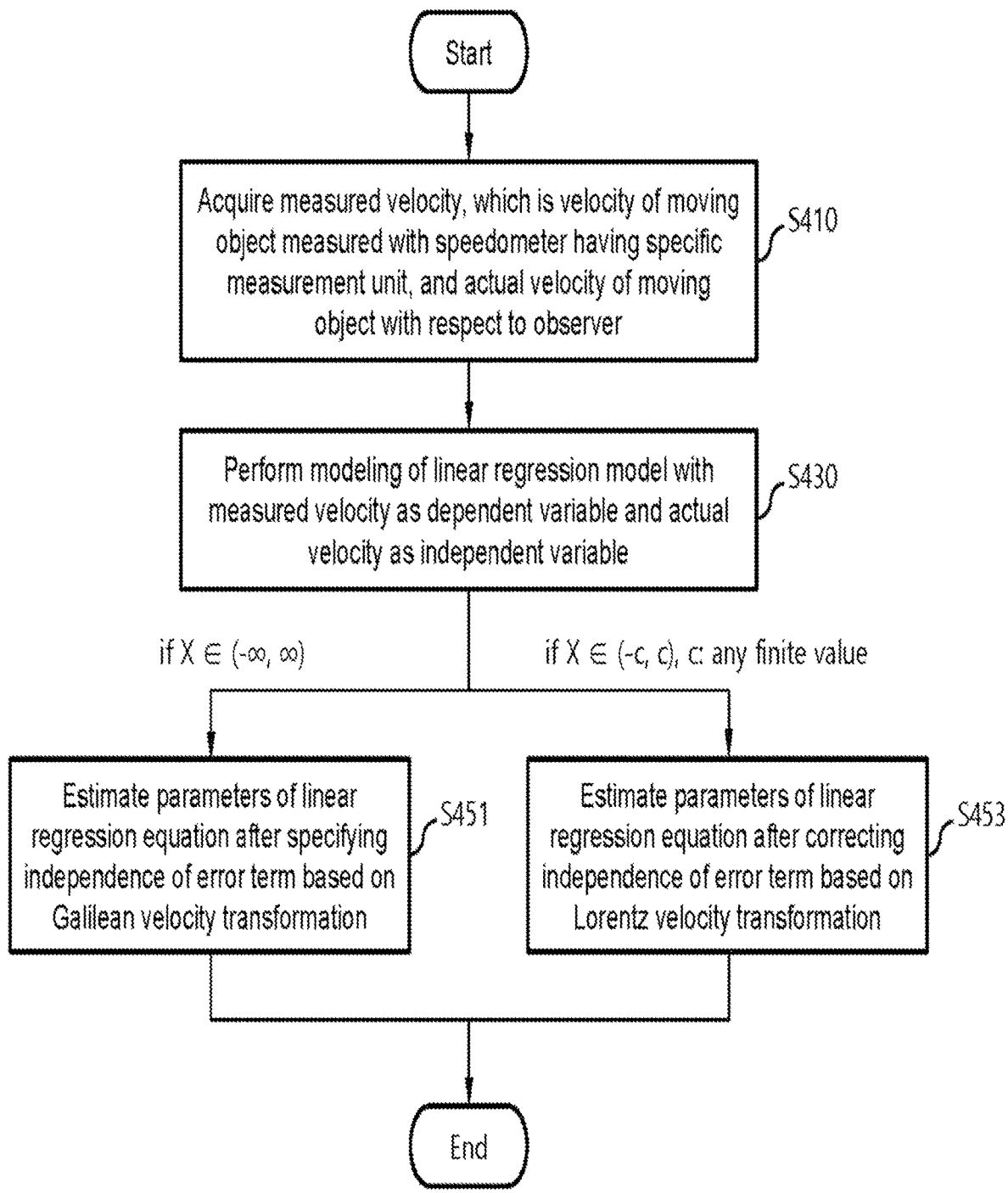

PARAMETER ESTIMATING METHOD BASED ON CORRECTION OF INDEPENDENCE OF ERROR TERM, COMPUTER PROGRAM FOR IMPLEMENTING THE SAME METHOD, AND SYSTEM CONFIGURED TO PERFORM THE SAME METHOD

CROSS-REFERENCE TO PRIOR APPLICATION

This application claims priority to Korean Patent Application No. 10-2020-0033460 (filed on Mar. 18, 2020), which is hereby incorporated by reference in its entirety.

BACKGROUND

The present disclosure relates to a technology of estimating a measurement unit and accuracy of a speedometer and, more particularly, to a parameter estimating method based on correction of independence of an error term, a computer program for implementing the method, and a system configured to perform the method, the method which is capable of statistically estimating a measurement unit of a speedometer and accuracy thereof, the speedometer having an error and measures a velocity of an object in an unknown measurement unit under the special theory of relativity.

In statistics, linear regression is a regression analysis approach to modeling the linear relationship between the dependent variable y and one or more independent variables (or explanatory variables) x. When linear regression is based on one explanatory variable, it is called simple linear regression, and when linear regression is based on two or more explanatory variables, it is called multiple linear regression.

Linear regression models a regression equation using a linear predictor function, and unknown parameters are estimated from data. The regression equation created in this way is called a linear model. There are several use cases of the linear regression, but linear regression may be generally summarized into one of two categories.

First, if the goal is to predict a value, a predictive model suitable for data is developed using the linear regression. By using the developed linear regression equation, it is possible to predict y for a value of x for which y is not given. In addition, when the dependent variable y and associated independent variables $X_1, \ldots, X_p$ thereof exist, linear regression analysis may be used to quantify the relationship between $X_j$ and y. $X_j$ may have nothing to do with y, or may be a variable that provides additional information.

RELATED LITERATURE

Patent Literature

Korean Patent Application Publication No. 10-2000-0058902 (Oct. 5, 2000)

SUMMARY

The present disclosure provides a parameter estimating method based on correction of independence of an error term, a computer program for implementing the method, and a system configured to perform the method, the method which is capable of statistically estimating a measurement unit of a speedometer and accuracy thereof, the speedometer having an error and measures a velocity of an object in an unknown measurement unit under the special theory of relativity.

The present disclosure also provides a parameter estimating method based on correction of independence of an error term, a computer program for implementing the method, and a system configured to perform the method, the method being capable of solving a problem that when the measurement unit of the speedometer is estimated by the least square method based on a linear regression model, the estimated value of the measurement unit and a variance of the estimated value vary depending on a velocity of a measuring person (whereby the confidence interval and the statistical confidence of the estimated value of the measurement unit vary).

The present disclosure also provides a parameter estimating method based on correction of independence of an error term, a computer program for implementing the method, and a system configured to perform the method, the method which estimates a parameter using an independence relationship between a momentum of an object measured at the relativistic center of momentum and the error term, so that the estimated value of the measurement unit and the variance of the estimated value (accordingly, the confidence interval and statistical significance of the estimated value of the measurement unit) can be acquired regardless of a velocity of a measuring person.

The present disclosure also provides a parameter estimating method based on correction of independence of an error term, a computer program for implementing the method, and a system configured to perform the method, the method being capable of being effectively applied even to other data having the relationship between a measured velocity with an error of an unknown measurement unit under the special theory of relativity and an actual velocity.

In an aspect, there is provided is a parameter estimating method based on correction of independence of an error term, and the method includes: acquiring a measured velocity, which is a velocity of a moving object measured with a speedometer being operated by an observer and having a specific measurement unit, and an actual velocity of the moving object with respect to the observer; performing modeling of a linear regression model with the measured velocity as a dependent variable and the actual velocity of the moving object with respect to the observer as an independent variable; and estimating parameters of a linear regression equation after correcting the independence of the error term based on Lorentz velocity transformation.

The actual velocity may include a velocity of a moving object measured with a speedometer having a negligible error, and the acquiring of the velocity may include measuring the velocity of the moving object with a speedometer having an unknown measurement unit as the specific measurement unit and having an error in velocity measurement, the error excluding the negligible error.

The estimating of the parameters may include specifying the independence of the error term with respect to a population regression equation defined by Equation 1 below as the linear regression equation:

$$Y_i = \beta_0 + \beta_1 \cdot X_i + \varepsilon_i \qquad \text{[Equation 1]}$$

where $Y_i$ denotes a velocity of moving object i measured with the speedometer, $X_i$ denotes an actual velocity of the moving object i (or a velocity of the moving object i measured with the speedometer having the negligible error), $\beta_0$ denotes accuracy or a systematic error of the speedometer, $\beta_1$ denotes the measurement unit of the speedometer, and $\varepsilon i$ denotes an error term that follows $N(0,\sigma^2)$ (where $N(0,\sigma^2)$ is a normal distribution with a variance of $\sigma^2$).

The estimating of the parameters may include setting the independent variable to be bounded to an open interval (−c, c) (where c is any finite value).

The estimating of the parameters may include correcting the independence of the error term to $E[\varepsilon \cdot f(\varphi)]=0$ by setting every moving object to have same rest mass in the Lorentz velocity transformation and then applying rapidity $\varphi$ of a moving object measured at a relativistic center of momentum.

The estimating of the parameters may include deriving $E[\varepsilon]=0$ and $E[\varepsilon \cdot \sinh(\varphi)]=0$ as a population moment condition based on the corrected independence of the error term, and estimating the parameters of the linear regression equation using the population regression equation and the derived population moment condition.

The estimating of the parameters may include estimating the parameters of the linear regression equation after deriving a sample regression equation and a sample moment condition, which correspond to the population regression equation and the derived population moment condition.

The estimating of the parameters may include estimating accuracy and the measurement unit of the speedometer as the parameters of the linear regression equation through Equation 2 below:

$$\hat{\beta}_0 = \overline{Y} - \hat{\beta}_1 \cdot \overline{X} = \overline{Y} - \frac{\sum_{i=1}^{N} Y_i \cdot \sinh(\phi_i)}{\sum_{i=1}^{N} X_i \cdot \sinh(\phi_i)} \cdot \overline{X} \quad [\text{Equation 2}]$$

$$\hat{\beta}_1 = \frac{\sum_{i=1}^{N} Y_i \cdot \sinh(\phi_i)}{\sum_{i=1}^{N} X_i \cdot \sinh(\phi_i)}$$

where $\hat{\beta}_0$ denotes an estimated accuracy of the speedometer, $\hat{\beta}_1$ denotes an estimated measurement unit of the speedometer, $$\overline{X} = \frac{1}{N}\sum_{i=1}^{N} X_i,$$

$$\overline{Y} = \frac{1}{N}\sum_{i=1}^{N} Y_i,$$

$$\phi_i = \theta_i - \theta_0,$$

$$\theta_i = \tanh^{-1}\left(\frac{X_i}{C}\right),$$

and $$\tanh(\theta_0) = \frac{\sum_{i=1}^{N}\sinh(\theta_i)}{\sum_{i=1}^{N}\cosh(\theta_i)}.$$

The estimating of the parameters may include, based on the estimated parameters of the linear regression equation, estimating the respective variances for the corresponding parameters through Equation 3 below:

$$\text{Var}(\hat{\beta}_0) = \text{Var}(\overline{Y} - \hat{\beta}_1 \cdot \overline{X}) = \text{Var}(\overline{Y}) + \overline{X}^2 \text{Var}(\hat{\beta}_1) \quad [\text{Equation 3}]$$

$$= \text{Var}\left(\frac{1}{N}\sum_{i=1}^{N}(\beta_0 + \beta_1 \cdot X_i + \epsilon_i)\right) + \overline{X}^2 \text{Var}(\hat{\beta}_1)$$

$$= \frac{1}{N^2} \cdot N \cdot \sigma^2 + \overline{X}^2 \text{Var}(\hat{\beta}_1)$$

$$= \frac{1}{N}\left(1 + \frac{(S^2 - C^2)(T-1)\overline{X}^2}{2c^2\left(C^2 - S^2 - \frac{C}{H}\right)^2}\right)\sigma^2$$

$$\text{Var}(\hat{\beta}_1) = \sigma^2 \frac{N(T-1)}{2} \frac{S^2 - C^2}{c^2 \cdot N^2 \left(C^2 - S^2 - \frac{C}{H}\right)^2} = \frac{(S^2 - C^2)(T-1)}{2c^2 \cdot N^2 \left(C^2 - S^2 - \frac{C}{H}\right)^2}\sigma^2$$

where $\text{Var}(\hat{\beta}_0)$ denotes a variance for $\hat{\beta}_0$, $\text{Var}(\hat{\beta}_1)$ denotes a variance for $\hat{\beta}_1$, $$S = \frac{1}{N}\sum_{i=1}^{N}\sinh(\theta_i),$$

$$C = \frac{1}{N}\sum_{i=1}^{N}\cosh(\theta_i),$$

$$T = \frac{1}{N}\sum_{i=1}^{N}\cosh(2 \cdot \phi_i),$$

and $$H = \frac{N}{\sum_{i=1}^{N}\frac{1}{\cosh(\theta_i)}}.$$

The estimating of the parameters may include, based on the estimated parameters of the linear regression equation, estimating the covariance between the corresponding parameters through Equation 4 below:

$$\text{Cov}(\hat{\beta}_0, \hat{\beta}_1) = E\left[(\hat{\beta}_0 - E[\hat{\beta}_0])(\hat{\beta}_1 - E[\hat{\beta}_1])\right] \quad [\text{Equation 4}]$$

$$= E\left[\{(\overline{Y} - \hat{\beta}_1\overline{X}) - E[\hat{\beta}_0]\}(\hat{\beta}_1 - E[\hat{\beta}_1])\right]$$

$$= E\left[\{(\overline{Y} - \hat{\beta}_1\overline{X}) - (\overline{Y} - \beta_1\overline{X})\}(\hat{\beta}_1 - E[\hat{\beta}_1])\right]$$

$$= E\left[\{(\overline{Y} - \hat{\beta}_1\overline{X}) - (\overline{Y} - \beta_1\overline{X})\}(\hat{\beta}_1 - \beta_1)\right]$$

$$= E\left[-\overline{X} \cdot (\hat{\beta}_1 - \beta_1)^2\right]$$

$$= -\overline{X} \cdot E\left[(\hat{\beta}_1 - \beta_1)^2\right]$$

$$= -\overline{X} \cdot \text{Var}(\hat{\beta}_1)$$

where $\text{Cov}(\hat{\beta}_0, \hat{\beta}_1)$ denotes a covariance between $\hat{\beta}_0$ and $\hat{\beta}_1$.

In another aspect, there is provided a parameter estimating system based on correction of independence of an error term, and the system includes: a moving object velocity acquiring unit configured to acquire a measured velocity, which is a velocity of a moving object measured with a speedometer being operated by an observer and having a specific measurement unit, and an actual velocity of the moving object with respect to the observer; a modeling unit configured to perform modeling of a linear regression model with the measured velocity as a dependent variable and the actual velocity of the moving object with respect to the observer as an independent variable; and a parameter estimating unit configured to estimate parameters of a linear regression equation after correcting the independence of the error term based on Lorentz velocity transformation.

In yet another aspect, there is provided a computer program stored in a computer-readable recording, the program in which each step of the parameter estimating method based on correction of independence of an error term is performed by a processor of an information processing device.

BRIEF DESCRIPTION OF THE DRAWINGS

FIG. 4 is a flowchart illustrating a process of estimating a parameter for velocity measurement based on correction of independence of an error term according to an embodiment of the present disclosure.

DETAILED DESCRIPTION

Figure 1:
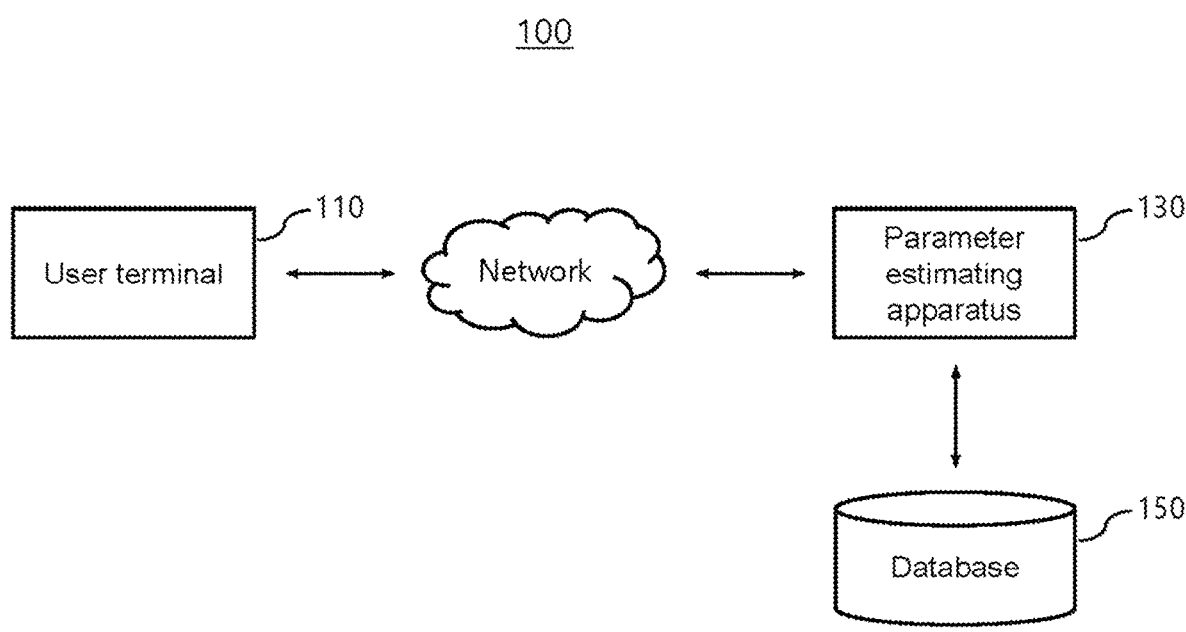
FIG. 1 is a diagram illustrating a parameter estimating system according to an embodiment of the present disclosure.

The following descriptions about the present disclosure are merely embodiments for describing the present disclosure in a structural or functional view and the scope of the invention should not be construed as being limited to the embodiments set forth herein. That is, since embodiments of the invention can be variously changed and have various forms, the scope of the present disclosure should be understood to include equivalents capable of realizing the technical spirit. Further, it should be understood that since a specific embodiment should include all objects or effects or include only the effects, the scope of the present disclosure is limited by the objects or effects.

Meanwhile, meanings of terms described in the present application should be understood as follows.

The terms "first," "second,", and the like are used to differentiate a certain component from other components, but the scope of the present disclosure should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that singular expressions encompass a plurality of expressions unless the context clearly dictates otherwise and it should be understood that term "include" or "have" indicates that a feature, a number, a step, an operation, a component, a part, or the combination thereof described in the specification is present, but does not exclude a possibility of the presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present disclosure can be implemented as a computer-readable code on a computer-readable recording medium and the computer-readable recording medium includes all types of recording devices for storing data that can be read by a computer system. Examples of the computer readable recording medium include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

FIG. 1 is a diagram illustrating a parameter estimating system according to an embodiment of the present disclosure.

Referring to FIG. 1, a parameter estimating system 100 may include a user terminal 110, a parameter estimating apparatus 130, and a database 150.

The user terminal 110 may correspond to a computing device capable of providing analysis data for parameter estimation and checking the analysis result, and may be implemented as a smartphone, a laptop computer, or a computer. However, aspects of the present disclosure are not necessarily limited thereto, and the user terminal 110 may be implemented as any of various devices, such as a tablet PC and the like. The user terminal 110 may be connected to the parameter estimating apparatus 130 via a network, and a plurality of user terminals 110 may be connected to the parameter estimating apparatus 130 at the same time.

The parameter estimating apparatus 130 may be implemented as a server corresponding to a computer or program that performs an operation of estimating a measurement unit and accuracy of a speedometer under the special theory of relativity and provides the result of the estimation. The parameter estimating apparatus 130 may be connected to the user terminal 110 via a network and may exchange information therewith.

In one embodiment, the parameter estimating apparatus 130 may store necessary data in a process of estimating a parameter of a linear regression model by compensating independence of an error term of the linear regression model based on analysis data that is collected in connection with the database 150. Meanwhile, unlike FIG. 1, the parameter estimating apparatus 130 may include the database 150. In addition, the parameter estimating apparatus 130 may be a physical component forming the system and may include a processor, a memory, a user input/output unit, and a network input/output unit, which will be described in more detail in FIG. 2.

The database 150 may correspond to a storage device that stores various types of information required to operate the parameter estimating apparatus 130. The database 150 may store analysis data for parameter estimation, and may store information on a linear regression model based on the analysis data. However, aspects of the present disclosure are not necessarily limited thereto, and the database 150 may store information that is collected or processed in various forms during a process in which the parameter estimating apparatus 130 estimates a parameter based on correction of independence of an error term.

Figure 2:
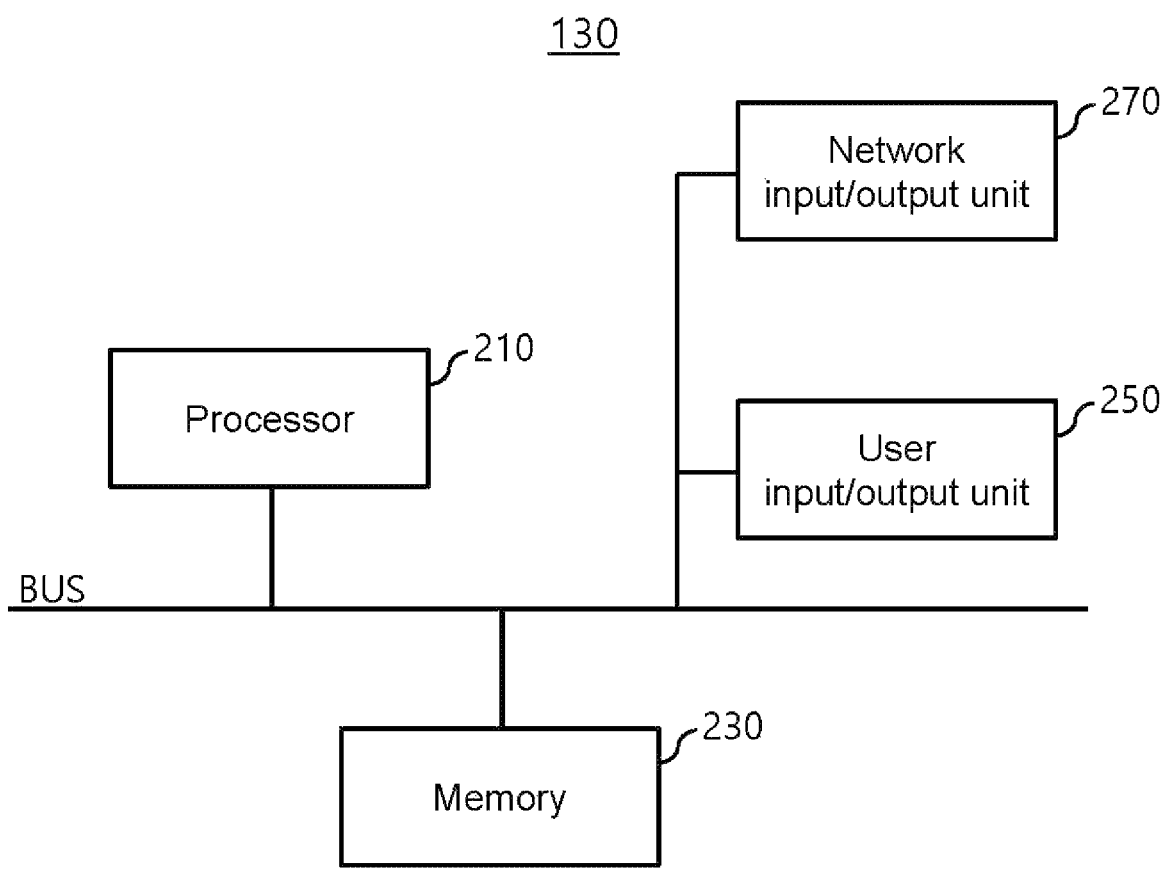
FIG. 2 is a diagram illustrating a physical configuration of a parameter estimating apparatus in FIG. 1.

FIG. 2 is a diagram illustrating a physical configuration of a parameter estimating apparatus in FIG. 1.

Referring to FIG. 2, the parameter estimating apparatus 130 may include a processor 210, a memory 230, a user input/output unit 250, and a network input/output unit 270.

The processor 210 may execute a procedure for processing each step in the process of operating the parameter estimating apparatus 130, may manage the memory 230 to be read or written throughout the process, and may schedule the synchronization time between a volatile memory and a nonvolatile memory in the memory 230. The processor 210 may control the overall operation of the parameter estimating apparatus 130, and may be electrically connected to the memory 230, the user input/output unit 250, and the network input/output unit 270 to control data flow therebetween. The processor 210 may be implemented as a central processing unit (CPU) of the parameter estimating apparatus 130.

The memory 230 may include an auxiliary memory device implemented as a nonvolatile memory such as a solid state drive (SSD) or a hard disk drive (HDD) to store all data required for the parameter estimating apparatus 130, and the memory 230 may include a main memory device implemented as a volatile memory such as random access memory (RAM).

The user input/output unit 250 may include an environment for receiving a user input and an environment for outputting specific information to a user. For example, the user input/output unit 250 may include an input device with an adapter, such as a touch pad, a touch screen, an on-screen keyboard, or a pointing device, and may also include an output device with an adapter, such as a monitor or a touch screen. In one embodiment, the user input/output unit 250 may correspond to a computing device that is connected through remote connection, and in this case, the parameter estimating apparatus 130 may serve as a server.

The network input/output unit 270 may include an environment for connecting to an external device or system via a network and may include, for example, an adapter for communication, such as a local area network (LAN), a metropolitan area network (MAN), a wide area network (WAN), a VAN (Value Added Network), and the like.

Figure 3:
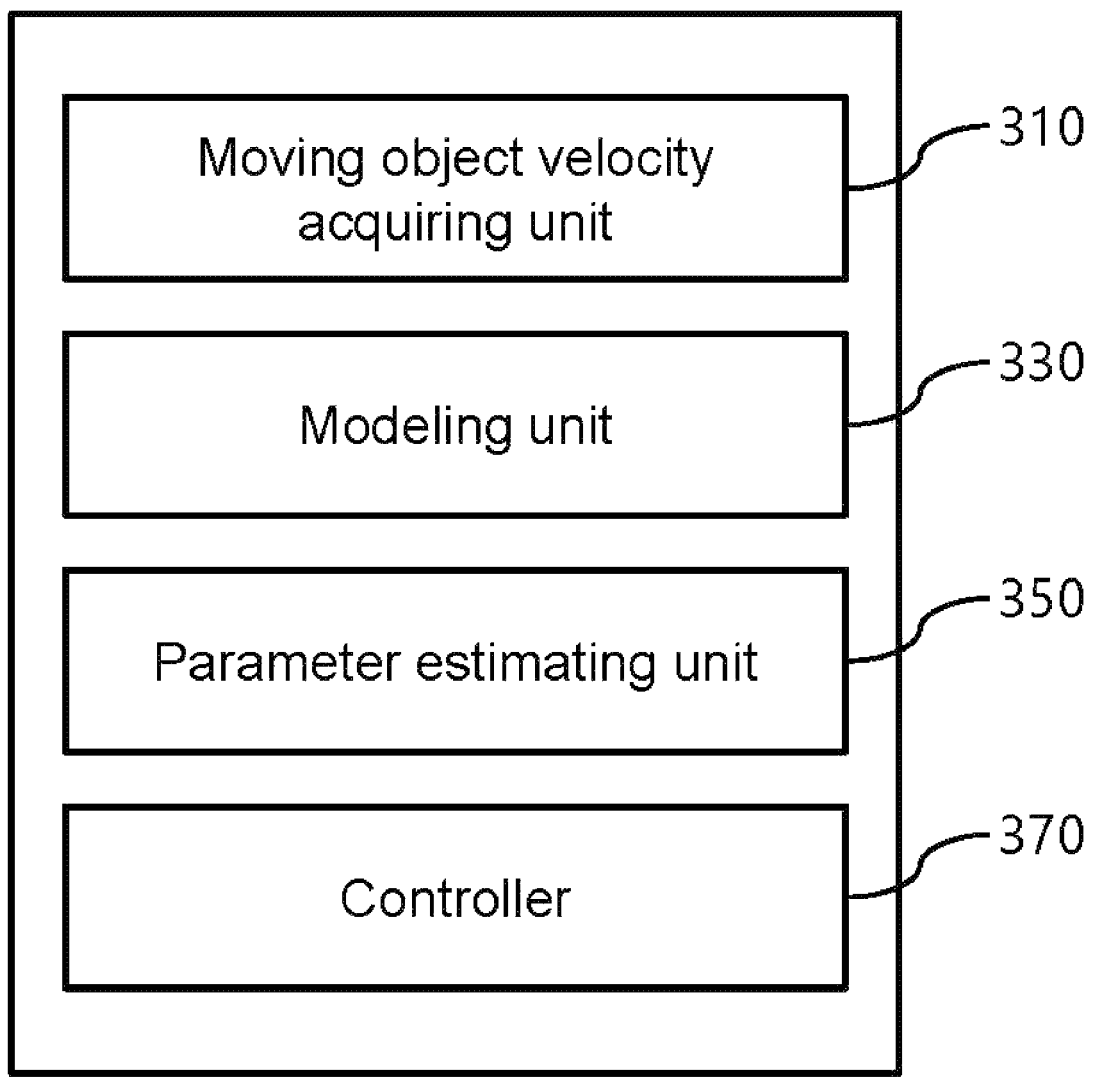
FIG. 3 is a diagram for explaining a functional configuration of a parameter estimating apparatus in FIG. 1.

FIG. 3 is a diagram for explaining a functional configuration of a parameter estimating apparatus in FIG. 1.

Referring to FIG. 3, the parameter estimating apparatus 130 may include a moving object velocity acquiring unit 310, a modeling unit 330, a parameter estimating unit 350, and a controller 370.

The moving object velocity acquiring unit 310 may acquire a measured velocity, which is a velocity of a moving object measured with a speedometer being operated by an observer and having a specific measurement unit, and an actual velocity of the moving object with respect to the observer. In one embodiment, the moving object velocity acquiring unit 310 may include a measurement unit in an unidentified state as the specific measurement unit, and may acquire a measured velocity by acquiring a velocity of a moving object with a speedometer having an error in velocity measurement, the error excluding a negligible error. In this case, the actual velocity of the moving object with respect to the observer may include a velocity of the moving object, which is measured with the speedometer having the negligible error.

Meanwhile, the moving object velocity acquiring unit 310 may receive a measured velocity and an actual velocity of a specific moving object through the user terminal 110 or retrieve data stored in the database 150, thereby being enabled to acquire the corresponding information.

That is, the parameter estimating apparatus 130 may statistically estimate a velocity measurement unit of a speedometer and accuracy thereof, the speedometer having an error and measuring a velocity of an object in an unknown measurement unit.

The modeling unit 330 may perform modeling of a linear regression model with the measured velocity as a dependent variable and the actual velocity of the moving object with respect to the observer as an independent variable.

The parameter estimating unit 350 may estimate parameters of a linear regression equation after correcting independence of an error term based on Lorentz velocity transformation. In one embodiment, the parameter estimating unit 350 may set the independent variable to be bounded to an open interval (−c, c) (where c is any finite value). That is, the parameter estimating unit 350 may correct the independence of the error term, considering the special theory of relativity in which if c denotes the speed of light, a velocity of an object can be observed only within the interval of (−c,c) in the real world and a velocity of the same object with respect to other observers is transformed by the Lorentz velocity transformation.

Meanwhile, although the present disclosure has been described with the example in which c denotes the speed of light, aspects of the present disclosure are not necessarily limited thereto and c may be any finite value according to a measurement unit of a speedometer that measures an actual velocity of an object.

More specifically, the parameter estimating unit 350 may correct an error term in a way that satisfies a condition in which the error term is independent not just of the exact velocity of the object, but also of the velocity of a measuring person, and the correction may be independent of the velocity of the measuring person and may be processed based on a result of establishing an independence relationship between the error term and a value specifying the velocity of the object. To this end, in a case where the rest mass of each moving object i is constant, the parameter estimating unit 350 may estimate a parameter by utilizing the independence relationship between the error term and momentum of an object measured at the relativistic center of momentum.

In one embodiment, the parameter estimating unit 350 may specify the independence of the error term with respect to a population regression equation that is defined by Equation 1 below as a linear regression equation. That is, the parameter estimating apparatus 130 may construct a linear regression model, thereby being enabled to statistically estimate the velocity measurement unit of the speedometer and the accuracy thereof as parameters by the least square method.

$$Y_i = \beta_0 + \beta_1 \cdot X_i + \in_i \quad \text{[Equation 1]}$$

Here, $Y_i$ denotes a velocity of moving object i measured with a speedometer, $X_i$ denotes an actual velocity of the moving object i (or a velocity of the moving object i measured with the speedometer having a negligible error), $\beta_0$ denotes accuracy or a systematic error of the speedometer, $\beta_1$ denotes a measurement unit of the speedometer, and $\varepsilon i$ denotes an error term that follows $N(0,\sigma^2)$.

If $X_1$ corresponds to the velocity of the moving object i measured with the speedometer having the negligible error, $Y_i$ may correspond to the velocity of the moving object i measured using a speedometer having an error in velocity measurement, the error excluding the negligible error.

In one embodiment, the parameter estimating unit 350 may correct the independence of the error term to $E[\varepsilon \cdot f(\varphi)]=0$ by setting every moving object to have the same rest mass in the Lorentz velocity transformation and then applying rapidity $\varphi$ of a moving object measured at the relativistic center of momentum.

In one embodiment, the parameter estimating unit 350 may derive $E[\varepsilon]=0$ and $E[\varepsilon \cdot \sinh(\varphi)]=0$ as a population moment condition based on the corrected independence of the error term, and may estimate the parameters of the linear regression equation using the population regression equation and the derived population moment condition.

In one embodiment, the parameter estimating unit 350 may estimate the parameters of the linear regression equation after deriving a sample regression equation and a sample moment condition, which correspond to the population regression equation and the derived population moment condition.

In one embodiment, the parameter estimating unit 350 may estimate the accuracy and the measurement unit of the speedometer as the parameters of the linear regression equation through Equation 2 below.

$$\hat{\beta}_0 = \overline{Y} - \hat{\beta}_1 \cdot \overline{X} = \overline{Y} - \frac{\sum_{i=1}^{N} Y_i \cdot \sinh(\phi_i)}{\sum_{i=1}^{N} X_i \cdot \sinh(\phi_i)} \cdot \overline{X} \qquad \text{[Equation 2]}$$

$$\hat{\beta}_1 = \frac{\sum_{i=1}^{N} Y_i \cdot \sinh(\phi_i)}{\sum_{i=1}^{N} X_i \cdot \sinh(\phi_i)}$$

Here, $\hat{\beta}_0$ denotes the estimated accuracy of the speedometer, and $\hat{\beta}_1$ denotes the estimated measurement unit of the speedometer. Also, $$\overline{X} = \frac{1}{N} \sum_{i=1}^{N} X_i,$$

$$\overline{Y} = \frac{1}{N} \sum_{i=1}^{N} Y_i,$$

$$\phi_i = \theta_i - \theta_0,$$

$$\theta_i = \tanh^{-1}\left(\frac{X_i}{c}\right),$$

and $$\tanh(\theta_0) = \frac{\sum_{i=1}^{N} \sinh(\theta_i)}{\sum_{i=1}^{N} \cosh(\theta_i)}.$$

In one embodiment, based on the estimated parameters of the linear regression equation, the parameter estimating unit 350 may estimate variances and a covariance for the corresponding parameters.

In one embodiment, based on the estimated parameters of the linear regression equation, the parameter estimating unit 350 may estimate a variance for the corresponding parameters through Equation 3 below.

$$\text{Var}(\hat{\beta}_0) = \text{Var}(\overline{Y} - \hat{\beta}_1 \cdot \overline{X}) = \text{Var}(\overline{Y}) + \overline{X}^2 \text{Var}(\hat{\beta}_1) \qquad \text{[Equation 3]}$$

$$= \text{Var}\left(\frac{1}{N} \sum_{i=1}^{N} (\beta_0 + \beta_1 \cdot X_i + \epsilon_i)\right) + \overline{X}^2 \text{Var}(\hat{\beta}_1)$$

$$= \frac{1}{N^2} \cdot N \cdot \sigma^2 + \overline{X}^2 \text{Var}(\hat{\beta}_1)$$

$$= \frac{1}{N}\left(1 + \frac{(S^2 - C^2)(T-1)\overline{X}^2}{2c^2\left(C^2 - S^2 - \frac{C}{H}\right)^2}\right)\sigma^2$$

$$\text{Var}(\hat{\beta}_1) = \sigma^2 \frac{N(T-1)}{2} \frac{S^2 - C^2}{c^2 \cdot N^2 \left(C^2 - S^2 - \frac{C}{H}\right)^2} =$$

$$\frac{(S^2 - C^2)(T-1)}{2c^2 \cdot N^2 \left(C^2 - S^2 - \frac{C}{H}\right)^2} \sigma^2$$

Here, $\text{Var}(\hat{\beta}_0)$ denotes the variance for $\hat{\beta}_0$, and $\text{Var}(\hat{\beta}_1)$ denotes the variance for $\hat{\beta}_1$. Also, $$S = \frac{1}{N} \sum_{i=1}^{N} \sinh(\theta_i),$$

$$C = \frac{1}{N} \sum_{i=1}^{N} \cosh(\theta_i),$$

$$T = \frac{1}{N} \sum_{i=1}^{N} \cosh(2 \cdot \phi_i),$$

and $$H = \frac{N}{\sum_{i=1}^{N} \frac{1}{\cosh(\theta_i)}}.$$

In one embodiment, based on the estimated parameters of the linear regression equation, the parameter estimating unit 350 may estimate the covariance between the corresponding parameters through Equation 4 below.

$$\text{Cov}(\hat{\beta}_0, \hat{\beta}_1) = E\left[(\hat{\beta}_0 - E[\hat{\beta}_0])(\hat{\beta}_1 - E[\hat{\beta}_1])\right] \qquad \text{[Equation 4]}$$

$$= E\left[\{(\overline{Y} - \hat{\beta}_1 \overline{X}) - E[\hat{\beta}_0]\}(\hat{\beta}_1 - E[\hat{\beta}_1])\right]$$

$$= E\left[\{(\overline{Y} - \hat{\beta}_1 \overline{X}) - (\overline{Y} - \beta_1 \overline{X})\}(\hat{\beta}_1 - E[\hat{\beta}_1])\right]$$

$$= E\left[\{(\overline{Y} - \hat{\beta}_1 \overline{X}) - (\overline{Y} - \beta_1 \overline{X})\}(\hat{\beta}_1 - \beta_1)\right]$$

$$= E\left[-\overline{X} \cdot (\hat{\beta}_1 - \beta_1)^2\right]$$

$$= -\overline{X} \cdot E\left[(\hat{\beta}_1 - \beta_1)^2\right]$$

$$= -\overline{X} \cdot \text{Var}(\hat{\beta}_1)$$

Here, $Cov(\hat{\beta}_0,\hat{\beta}_1)$ denotes the covariance between $\hat{\beta}_0$ and $\hat{\beta}_1$.

The controller 370 may control the overall operation of the parameter estimating apparatus 130, and may manage a control flow or data flow between the moving object velocity acquiring unit 310, the modeling unit 330, and the parameter estimating unit 350.

FIG. 4 is a flowchart illustrating a process of estimating a parameter for velocity measurement based on correction of independence of an error term according to an embodiment of the present disclosure.

Referring to FIG. 4, the parameter estimating apparatus 130 may use the moving object velocity acquiring unit 310 to acquire a measured velocity, which is a velocity of a moving object measured with a speedometer being operated by an observer and having a specific measurement unit, and an actual velocity of the moving object with respect to the observer in operation S410. The parameter estimating apparatus 130 may use the modeling unit 330 to perform modeling of a linear regression model with the measured velocity as a dependent variable and the actual velocity of the moving object with respect to the observer as an independent variable in operation S430. In a case where the independent variable is bounded to an open interval, that is, if $X \in (-c,c)$ (where c is any finite value), the parameter estimating apparatus 130 may use the parameter estimating unit 350 to estimate the parameters of the linear regression equation after correcting independence of an error term for the linear regression equation based on the Lorentz velocity transformation, in operation S453.

On the contrary, in a case where the independent variable is not bounded to the open interval, that is, if $X \in (-\infty,\infty)$, the parameter estimating apparatus 130 may use the parameter estimating unit 350 to estimate the parameters of the linear regression equation after specifying the independence of the error term for the linear regression equation based on Galilean velocity transformation, in operation S451. In this case, an OLS estimator and a variance thereof may be utilized.

Hereinafter, a parameter estimating method based on correction of independence of an error term according to the present disclosure will be described in more detail.

1. INTRODUCTION

Linear regression is one of the most frequently used models in empirical analysis.

$$Y_i = \beta_0 + \beta_1 \cdot X_{1i} + \beta_2 \cdot X_{2i} + \ldots + \beta_p \cdot X_{pi} + \epsilon_i$$

Here, $\beta_p$ denotes a measure of association between the independent variable $X_p$ and the dependent variable Y, and $\beta_0$ denotes an expected value of Y when all $X_p$ are equal to 0. $\epsilon_i$ denotes an error term.

The linear regression model is based on the following assumptions.

Assumption 1: The independent variable is measured without an error.

Assumption 2: The error is independent of the independent variable.

Assumption 3: The error is independently and identically normally distributed.

In a linear regression model, an unknown parameter is often estimated using the ordinary least squares (OLS) method. This is because an Ordinary Least Squares (OLS) estimator has desirable properties as a parameter estimator such as unbiasedness, consistency, and efficiency.

The linear regression model and the OLS estimator provide accurate inference and an accurate estimated value only when the above assumptions are true. The assumption of an error term that is normally distributed conditional on the independent variables implies that the dependent variable can be any real number. When the range of dependent variables is bounded (for example, when the variables are discontinuous or bounded), this assumption is violated. Since a linear regression model with a bounded dependent variable can lead to a serious error in inference, alternative nonlinear models and procedures have been developed and adopted, for example, a Tobit model regarding a censored dependent variable and a Poisson regression model regarding a count (non-negative integer) dependent variable.

In contrast, researchers do not pay attention to whether a bounded range of independent variables exists in a model as long as the variables are exogenous and measured without an error. This is because such variables do not violate any assumptions of the linear regression model. Traditional (e.g., OLS) estimators are used to estimate unknown parameters of the linear regression model although the range of independent variables is limited.

Does any problem arise with the use of the OLS estimators when the range of independent variables is bounded as long as the independent variables are exogenous and measured without an error? If so, what is the desired estimator when the range of independent variables is bounded?

A simple linear regression model in which exogenous and error-free independent variables are essentially bounded to an open interval is explored in order to investigate a problem that occurs when an OLS estimator is used in a case where the range of independent variables is bounded. A linear regression model is used to estimate a unit (scale) (i.e., a slope coefficient) and accuracy (i.e., an intercept coefficient) of the speedometer according to special relativity (see Chapter 2 for details). In this model, the dependent variable is a velocity of an object measured by an observer with a speedometer having a normally distributed error, and the independent variable is an actual velocity of the object with respect to the observer. In the real world where the special theory of relativity is applied, the actual velocity (independent variable) of the object (which has mass, i.e., static mass greater than 0) with respect to the observer is bounded to the open interval, (−c,c). Here, c denotes the speed of light.

The OLS estimator for the slope coefficient depends on the observer's velocity under special relativity. In order to address this problem, the present disclosure proposes and uses a new estimator for a slope coefficient that is independent of the observer's velocity. In addition, an estimator for a new intercept coefficient is also proposed and used.

It is confirmed that the proposed estimator is an unbiased estimator, and the proposed estimator converges to the OLS estimator when c approaches infinity. The variance of the proposed estimator is greater than that of the OLS estimator, which reflects the fact that when the range of independent variables is bounded, the uncertainty of the estimated slope coefficient and the estimated intercept coefficient becomes greater. When c approaches infinity, the variance of the proposed estimator converges to the variance of the OLS estimator.

Hereinafter, the remaining parts are configured as follows. Chapter 2 explains a linear regression model according to special relativity. Chapter 3 explains that it is inadequate to use an OLS estimator in a linear regression model under the special theory of relativity. Chapter 4 provides the rationale for an alternative estimator. Chapter 5 explains an alternative estimator for a linear regression model under the special theory of relativity. Chapter 6 explains properties of an alternative estimator. Lastly, Chapter 7 provides a summary of the conclusion.

2. LINEAR REGRESSION MODEL UNDER SPECIAL RELATIVITY

This chapter explains a special relativity situation in which a simple linear regression model with an independent variable bounded to an essentially open interval (−c,c) appears.

Suppose that an engineer has developed a speedometer. The speedometer has 0 on average in terms of precision, and the variance of the speedometer has a random error that follows an unknown normal distribution. The random error is independent of the actual velocity of a measured object, as well as the velocity of an observer who is carrying the speedometer. The engineer cannot be sure in what unit the speedometer measures the velocity of the object, such as meters/seconds, miles/hours, or the like. If the actual velocity of the object is measured in meters/second, the measurement unit of the newly developed speedometer may be expressed as $\beta_1$ meters/second. In the worst case, the speedometer does not reflect the actual velocity of the object at all, i.e., $\beta_1=0$. Also, when measuring the velocity of a stationary object from the observer, the engineer is not sure if the speedometer is adjusted to 0, that is, if the speedometer shows the velocity of zero. That is, the speedometer has a systematic bias $\beta_0$ in terms of accuracy.

Suppose that the engineer brings a speedometer to a researcher who has a speedometer (or a speedometer having a negligible error) that can accurately measure the velocity of an object in meters/second. The engineer asks the researcher about whether his speedometer can measure the velocity of the object (that is, whether $\beta_1 \neq 0$), and, if so (that is, if $\beta_1 \neq 0$), what scale the speedometer uses (what measurement unit is), and how much the engineer has to adjust his speedometer to ensure the velocity of 0 with respect to a stationary object from an observer. In the real (relativistic) world, the actual velocity of the object (which has mass, i.e., static mass greater than 0) is bounded to the open interval (−c,c). Here, c denotes the speed of light in meters/second. Therefore, the researcher's speedometer always shows values in the range of (−c,c).

Therefore, a population regression equation may be expressed as follows.

$$Y_i = \beta_0 + \beta_1 \cdot X_i + \epsilon_i \qquad (2.1)$$

$Y_i$: velocity of object i measured with a newly developed speedometer $X_i$: actual velocity of the object i measured in meters/second, $X_i \in (-c,c)$ $\beta_0$: systematic error of the speedometer with respect to a stationary object from an observer $\beta_1$: scale of the speedometer in meters/second (measurement unit)

$\epsilon i$: error term of the speedometer, which follows $N(0,\sigma^2)$ (normal distribution)

3. INVESTIGATING THE INADEQUACY OF OLS ESTIMATOR UNDER SPECIAL RELATIVITY

This chapter explains that it is inappropriate to use an OLS estimator under special relativity.

3.1. Newtonian Universe Suppose that an engineer and a researcher live in the Newtonian universe. The actual velocity of an object (which has mass, i.e., static mass greater than 0) may range from −∞ to ∞ in the Newtonian universe, so the regression model is a simple linear regression model with an unbounded range of independent variables.

The researcher may carry out experiments to measure the velocity of N objects moving along a straight line with a newly developed speedometer and an accurate speedometer (or a speedometer having a negligible error). The researcher may use an OLS estimator to estimate unknown parameters based on relevant data.

An OLS sample regression equation corresponding to Equation (2.1) may be written as follows.

$$Y_i = \hat{\beta}_{0,OLS} + \hat{\beta}_{1,OLS} \cdot X_i + \hat{\epsilon}_i \qquad (3.1)$$

Here, $\hat{\beta}_{0,OLS}$ and $\hat{\beta}_{1,OLS}$ are the OLS estimators of $\beta_0$ and $\beta_1$, respectively, and $\hat{\epsilon}_i$ is the OLS residuals of the sample i.

The primary conditions of the OLS estimators $\hat{\beta}_{0,OLS}$ and $\hat{\beta}_{1,OLS}$ are $\Sigma_{i=1}^{N} \hat{\epsilon}_i = 0$ and $\Sigma_{i=1}^{N} \hat{\epsilon}_i \cdot X_i 0$, respectively.

The OLS estimator may be considered a method of moments estimator based on the population moment conditions $E[\epsilon]=0$ and $E[\epsilon \cdot X]=0$.

The estimated values $\hat{\beta}_{1,OLS}$ and $\hat{\beta}_{1,OLS}$ are bivariate normally distributed, and the means, variances, and covariance thereof are as follows.

$$\hat{\beta}_{1,OLS} = \frac{\sum_{i=1}^{N}(Y_i - \overline{Y}) \cdot (X_i - \overline{X})}{\sum_{i=1}^{N}(X_i - \overline{X})^2} \qquad (3.2)$$

$$\hat{\beta}_{0,OLS} = \overline{Y} - \hat{\beta}_{1,OLS} \cdot \overline{X} \qquad (3.3)$$

$$\text{Var}(\hat{\beta}_{1,OLS}) = \frac{1}{\sum_{i=1}^{N}(X_i - \overline{X})^2} \sigma^2 \qquad (3.4)$$

$$\text{Var}(\hat{\beta}_{0,OLS}) = \frac{\sum_{i=1}^{N} X_i^2}{\sum_{i=1}^{N} N(X_i - \overline{X})^2} \sigma^2 \qquad (3.5)$$

$$\text{Cov}(\hat{\beta}_{0,OLS}, \hat{\beta}_{1,OLS}) = \frac{\overline{X}}{\sum_{i=1}^{N}(X_i - \overline{X})^2} \sigma^2 \qquad (3.6)$$

Here, $$\overline{X} = \frac{1}{N}\sum_{i=1}^{N} X_i \text{ and } \overline{Y} = \frac{1}{N}\sum_{i=1}^{N} Y_i.$$

$\hat{\beta}_{1,OLS}$ denotes the scale of the speedometer, and $\hat{\beta}_{0,OLS}$ denotes the estimated value of the systematic error. The (simultaneous) confidence interval thereof may be determined by the variances and the covariance.

If the researcher measures the velocity of an object with an accurate speedometer (or a speedometer having a negligible error) while moving in a relatively positive direction than before at a constant velocity $v^*$, $X_i' = X_i - v^*$ may be obtained. This transformation is called the Galilean velocity transformation. The relationship between $X_i$ and $X_i'$ may be expressed as follows.

$$X_i = (X_i - \overline{X}) + \overline{X} = x_i + \overline{X} \qquad (3.7)$$

$$X_i' = X_i - v^* = x_i + \overline{X} - v^* = x_i + \overline{X}' \qquad (3.8)$$

Here, $x_i = X_i - \overline{X}$ and $$\overline{X}' = \frac{1}{N}\sum_{i=1}^{N} X_i'.$$

$X_i$ and $X_i'$ have the same demeaned velocity $x_i$. In other words, the demeaned velocity does not change in the Galilean velocity transformation. In addition, the sum of the demeaned velocity is 0 and ($\sum_{i=1}^{N} x_i = 0$), $X_i$, $X_i'$, and $x_i$ have the same variance.

If the researcher measures the velocity of an object with a newly developed speedometer while moving in a positive direction with a constant velocity v* than before, $Y_i' = Y_i - \beta_1 \cdot (X_i - X_i') = Y_i - \beta_1 \cdot v^*$ may be measured.

Since the error term must be independent of the researcher's velocity and the object's actual velocity, the independence of the error term from the actual velocity must be specified by the velocity $x_i$ obtained by removing the unchanging mean from the researcher's velocity. Therefore, the independence of the error term from the object's actual velocity and the researcher's actual velocity is specified as $E[\varepsilon \cdot x] = 0$. $E[\varepsilon \cdot x] = 0$ is equal to $E[\varepsilon \cdot X] = 0$, and the error term independent of x is also independent of X and X'.

The OLS estimator $\hat{\beta}'_{1,OLS}$ based on $X_i'$ and $Y_i'$ and the variance $Var(\hat{\beta}'_{1,OLS})$ thereof are the same as $\hat{\beta}_{1,OLS}$ and $Var(\hat{\beta}_{1,OLS})$.

This shows that the OLS estimator for $\beta_1$ and the variance thereof do not change regardless of the researcher's velocity in the Newtonian universe. In other words, the OLS estimator for $\beta_1$ and the variance thereof do not change in the Galilean velocity transformation.

3.2. Real Relativistic World

The real world is different from the Newtonian universe. In the real (relativistic) world, the actual velocity of an object (which has mass, i.e., static mass greater than 0) is bounded to the open interval (−c,c), where c is the speed of light. Also, if a researcher in the real (relativistic) world measures the velocity of the object while moving in a positive direction with a constant velocity v* than before, the following velocity may be obtained according to the Lorentz velocity transformation.

$$X_i'' = \frac{X_i - v_*}{1 - \frac{v_* \cdot X_i}{c^2}} \quad (3.9)$$

$$Y_i'' = y_i - \beta_1 \cdot (X_i - X_i'') \quad (3.10)$$

Unlike the Newtonian universe case, the OLS estimator $\hat{\beta}''_{1,OLS}$ based on $X_i$ and $Y_i''$ and the variance $Var(\hat{\beta}''_{1,OLS})$ thereof are different from $\hat{\beta}_{1,OLS}$ and $Var(\hat{\beta}_{1,OLS})$. This shows that the OLS estimator for pi and the variance thereof are not independent of the researcher's velocity in the real (relativistic) world.

This problem occurs because the demeaned velocity is not constant in the Lorentz velocity transformation. Since $X_i$ and $X_i''$ have different demeaned velocities, i.e., $x_i \neq x_i''$ (where $x_i'' = X_i'' - \overline{X}''$ and $$\overline{X}'' = \frac{1}{N}\sum_{i=1}^{N} X_i'' \Big),$$

$E[\varepsilon \cdot X] = 0$ is not the same as $E[\varepsilon \cdot X''] = 0$.

This result shows that in order to obtain an estimated value of pi independent of the researcher's velocity and the variance of the estimated value in the real (relativistic) world, the independence of the error term from the object's velocity and the independence of the error term from the researcher's velocity need to be simultaneously specified as a quantity that does not change in the Lorentz velocity transformation.

4. INDEPENDENCE OF ERROR TERM IN THE RELATIVISTIC UNIVERSE

In this chapter, there is proposed a method for finding an unchanging quantity (invariant) in the Lorentz velocity transformation and specifying independence of an error term from an object's velocity and independence of the error term from the researcher's velocity at the same time. The goal is to correctly estimate parameters of a regression model. Details about the concept of special relativity and the concept of the Lorentz invariant are omitted.

In physics, rapidity $\theta$ of velocity X is defined as follows.

$$\theta = \tanh^{-1}\left(\frac{X}{c}\right) \quad (4.1)$$

Relativistic momentum and energy of an object with the velocity 8 and the static mass m are defined as follows.

$$\text{Momentum} = m \cdot \sinh(\theta) \quad (4.2)$$

$$\text{Energy} = m \cdot \cosh(\theta) \quad (4.3)$$

Let's say that $\theta_i$, $\theta_i''$, and $\theta^*$ are rapidities of $X_1$, $X_1''$, and v*, respectively.

$$\theta_i = \tanh^{-1}\left(\frac{X_i}{c}\right) \quad (4.4)$$

$$\theta_i'' = \tanh^{-1}\left(\frac{X_i''}{c}\right) \quad (4.5)$$

$$\theta_* = \tanh^{-1}\left(\frac{v_*}{c}\right) \quad (4.6)$$

In this case, the following relationship is established between $\theta_i$, $\theta_i''$, and $\theta^*$.

$$\theta_i'' = \theta_i - \theta^* \quad (4.7)$$

Therefore, $X_i$ and $X_i''$ may be expressed as follows.

$$X_i = c \cdot \tanh(\theta_i) \quad (4.8)$$

$$X_i'' = c \cdot \tanh(\theta_i'') = c \cdot \tanh(\theta_i - \theta^*) \quad (4.9)$$

Let's define $\theta_0$ and $\theta_0''$ as follows.

$$\tanh(\theta_0) = \frac{\sum_{i=1}^{N} \sinh(\theta_i)}{\sum_{i=1}^{N} \cosh(\theta_i)} \quad (4.10)$$

$$\tanh(\theta_0'') = \frac{\sum_{i=1}^{N}\sinh(\theta_i'')}{\sum_{i=1}^{N}\cosh(\theta_i'')} \quad (4.11)$$

(4.12)

In this case, the following relationship is established between $\theta_0$, $\theta_0''$, and $\theta^*$.

$$\theta^* = \theta_0 - \theta_0'' \quad (4.13)$$

If $\phi_i = \theta_i - \theta_0$, $\theta_i$ and $\theta_i''$ may be expressed as follows.

$$\theta_i = (\theta_i - \theta_0) + \theta_0 = \phi_i + \theta_0 \quad (4.14)$$

$$\theta_i'' = \theta_i - \theta^* = \theta_i - (\theta_0 - \theta_0'') = (\theta_i - \theta_0) + \theta_0'' = \phi_i + \theta_0'' \quad (4.15)$$

These results show that $\phi_i$ does not change regardless of the velocity of the researcher. Since $\phi_i$ does not change, all functions of $\phi_i$, especially the relativistic momentum $\sinh(\phi_i)$ and the relativistic energy $\cosh(\phi_i)$, do not change regardless of the velocity of the researcher. Also, the following relationship is established.

$$\sum_{i=1}^{N}\sinh(\phi_i) = \sum_{i=1}^{N}\sinh(\theta_i - \theta_0) = \sum_{i=1}^{N}\sinh(\theta_i'' - \theta_0'') = 0 \quad (4.16)$$

$$\sum_{i=1}^{N}\cosh(\phi_i) = \sum_{i=1}^{N}\cosh(\theta_i - \theta_0) = \sum_{i=1}^{N}\cosh(\theta_i'' - \theta_0'') \quad (4.17)$$

Equation (4.16) shows that the sum of the relativistic momentum of the objects is 0, assuming that all the objects have the same static mass if the researcher measures the velocity (rapidity) of an object while moving in a positive direction with a constant rapidity $\theta_0$ than before. In this assumption, the rapidity $\theta_0$ is related to the relativistic center of momentum. Thus, $\phi_i$ may be regarded as the rapidity of the object i measured at the relativistic center of momentum, assuming that all the objects have the same static mass.

Since the error term must be independent of the researcher's velocity as well as the object's actual velocity, the independence of the error term needs to be specified as a quantity that does not change with respect to the researcher's velocity. Therefore, the independence of the error term may be specified as $E[\epsilon \cdot f(\phi)] = 0$.

Parameters may be estimated using the following sample moment condition corresponding to the population moment conditions $E[\epsilon] = 0$ and $E[\epsilon \cdot f(\phi)] = 0$.

$$\overline{Y} - \hat{\beta}_0 - \hat{\beta}_1 \cdot \overline{X} = 0 \quad (4.18)$$

$$\frac{1}{N}\left\{\sum_{i=1}^{N}Y_i \cdot f(\phi_i) - \hat{\beta}_0\sum_{i=1}^{N}f(\phi_i) - \hat{\beta}_1\sum_{i=1}^{N}X_i \cdot f(\phi_i)\right\} = 0$$

In a case where $\beta_1 = 0$, if $\Sigma_{i=1}^{N} f(\phi_i) \neq 0$, $\beta_0$ is not uniquely identified. Accordingly, $\Sigma_{i=1}^{N} f(\phi_i)$ must be derived as 0. Therefore, $E[\epsilon \cdot \sinh(\phi)] = 0$ is selected as the population moment condition.

5. SPECIAL RELATIVISTIC LINEAR REGRESSION ESTIMATOR

A population regression equation is as shown in Equation (2.1). Population moment conditions are as follows.

$$E[\epsilon] = 0 \quad (5.1)$$

$$E[\epsilon \cdot \sinh(\phi)] \quad (5.2)$$

A sample regression equation is as follows.

$$Y_i = \hat{\beta}_0 + \hat{\beta}_1 \cdot X_i + \hat{\epsilon}_i \quad (5.3)$$

Meanwhile, sample moment conditions are as follows.

$$\frac{1}{N}\sum_{i=1}^{N}\hat{\epsilon}_i = 0 \quad (5.4)$$

$$\frac{1}{N}\sum_{i=1}^{N}\hat{\epsilon}_i \cdot \sinh(\phi_i) = 0 \quad (5.5)$$

The following is derived as follows from Equation (5.4).

$$\frac{1}{N}\sum_{i=1}^{N}\hat{\epsilon}_i = \frac{1}{N}\sum_{i=1}^{N}(Y_i - \hat{\beta}_0 - \hat{\beta}_1 \cdot X_i) = \quad (5.6)$$

$$\frac{1}{N}\sum_{i=1}^{N}Y_i - \hat{\beta}_0 - \frac{\hat{\beta}_1}{N}\sum_{i=1}^{N}X_i = \overline{Y} - \hat{\beta}_0 - \hat{\beta}_1 \cdot \overline{X} = 0$$

The following is derived as follows from Equation (5.5).

$$\frac{1}{N}\sum_{i=1}^{N}\hat{\epsilon}_i \cdot \sinh(\phi_i) = \frac{1}{N}\sum_{i=1}^{N}(Y_i - \hat{\beta}_0 - \hat{\beta}_1 \cdot X_i) \cdot \sinh(\phi_i) = \quad (5.7)$$

$$\frac{1}{N}\left\{\sum_{i=1}^{N}Y_i \cdot \sinh(\phi_i) - \hat{\beta}_0\sum_{i=1}^{N}\sinh(\phi_i) - \hat{\beta}_1\sum_{i=1}^{N}X_i \cdot \sinh(\phi_i)\right\} =$$

$$\frac{1}{N}\left\{\sum_{i=1}^{N}Y_i \cdot \sinh(\phi_i) - \hat{\beta}_1\sum_{i=1}^{N}X_i \cdot \sinh|\phi_i|\right\} = 0$$

Let's consider $\Sigma_{i=1}^{N} X_i \cdot |\sinh(\phi_i)| > 0$ (Refer to A.1 for proof).

Therefore, the following is derived.

$$\hat{\beta}_1 = \frac{\sum_{i=1}^{N}Y_i \cdot \sinh(\phi_i)}{\sum_{i=1}^{N}X_i \cdot \sinh(\phi_i)} \quad (5.8)$$

$$\hat{\beta}_0 = \overline{Y} - \hat{\beta}_1 \cdot \overline{X} = \overline{Y} - \frac{\sum_{i=1}^{N}Y_i \cdot \sinh(\phi_i)}{\sum_{i=1}^{N}X_i \cdot \sinh(\phi_i)} \cdot \overline{X} \quad (5.9)$$

6. PROPERTIES OF SPECIAL RELATIVISTIC LINEAR REGRESSION ESTIMATOR

In this chapter, the properties of the proposed estimator are described.

6.1 Linearity of $\hat{\beta}_1$

The estimator $\hat{\beta}_1$ may be expressed as a linear combination of $Y_i$ (i=1, ..., N) which are the sample values of Y. Referring to Equation (5.8), $\hat{\beta}_1 = \Sigma_{i=1}^{N} k_i \cdot Y_i$ and $$k_i = \frac{\sinh(\phi_i)}{\sum_{i=1}^{N} X_i \cdot \sinh(\phi_i)}.$$

This means that $\hat{\beta}_1$ is normally distributed. Also, since $\hat{\beta}_0 = \overline{Y} - \hat{\beta}_1 \cdot \overline{X}$ is shown in (5.9), $\hat{\beta}_0$ is also normally distributed. Thus, $\hat{\beta}_1$ and $\hat{\beta}_0$ are bivariate normally distributed.

6.2 Unbiasedness of $\hat{\beta}_1$ and $\hat{\beta}_0$ $$\sum_{i=1}^{N} k_i = \frac{\sum_{i=1}^{N} \sinh(\phi_i)}{\sum_{i=1}^{N} X_i \cdot \sinh(\phi_i)} = 0. \text{ and} \quad (6.1)$$

$$\sum_{i=1}^{N} k_i \cdot X_i = \frac{\sum_{i=1}^{N} X_i \cdot \sinh(\phi_i)}{\sum_{i=1}^{N} X_i \cdot \sinh(\phi_i)} = 1.$$

$$\hat{\beta}_1 = \sum_{i=1}^{N} k_i \cdot Y_i$$

$$= \sum_{i=1}^{N} k_i (\beta_0 + \beta_1 \cdot X_i + \epsilon_i)$$

$$= \beta_0 \sum_{i=1}^{N} k_i + \beta_1 \sum_{i=1}^{N} k_i \cdot X_i + \sum_{i=1}^{N} k_i \cdot \epsilon_i$$

$$= \beta_1 + \sum_{i=1}^{N} k_i \cdot \epsilon_i$$

$$E[\hat{\beta}_1] = E\left[\beta_1 + \sum_{i=1}^{N} k_i \cdot \epsilon_i\right] \quad (6.2)$$

$$= E[\beta_1] + E\left[\sum_{i=1}^{N} k_i \cdot \epsilon_i\right]$$

$$= \beta_1 + \sum_{i=1}^{N} k_i \cdot E[\epsilon_i \mid X_i] \text{ since } \beta_1 \text{ is a constant and the } k_i \text{ are random}$$

$$= \beta_1 + \sum_{i=1}^{N} k_i \cdot 0 \text{ since } E[\epsilon_i \mid X_i] = 0 \text{ by assumption}$$

$$= \beta_1$$

Therefore, $\hat{\beta}_1$ is the unbiased estimator of $\beta_1$.

$$\hat{\beta}_0 = \overline{Y} - \hat{\beta}_1 \cdot \overline{X} = (\beta_0 + \beta_1 \cdot \overline{X} + \overline{\epsilon}) - \hat{\beta}_1 \cdot \overline{X} = \beta_0 + (\beta_1 - \hat{\beta}_1) \cdot \overline{X} + \overline{\epsilon} \quad (6.3)$$

$$E[\hat{\beta}_0] = E[\beta_0 + (\beta_1 - \hat{\beta}_1) \cdot \overline{X} + \overline{\epsilon}] \quad (6.4)$$

$$= E[\beta_0] + E[(\beta_1 - \hat{\beta}_1) \cdot \overline{X}] + E[\overline{\epsilon}]$$

$$= \beta_0 + \overline{X} \cdot E[(\beta_1 - \hat{\beta}_1)] + E[\overline{\epsilon}] \text{ since } \beta_0 \text{ is a constant}$$

$$= \beta_0 + \overline{X} \cdot E[(\beta_1 - \hat{\beta}_1)] \text{ since } E[\overline{\epsilon}] = 0 \text{ by assumption}$$

$$= \beta_0 + \overline{X}(E[(\beta_1] - E[\hat{\beta}_1]))$$

$$= \beta_0 + \overline{X}(\beta_1 - \beta_1) \text{ since } E[\beta_1] = \beta_1 \text{ and } E[\hat{\beta}_1] = \beta_1$$

$$= \beta_0$$

Therefore, $\hat{\beta}_0$ is the unbiased estimator of $\beta_0$.

6.3. Variance of $\hat{\beta}_1$ and $\hat{\beta}_0$

Using the assumption that yi is independently distributed, the variance of $\hat{\beta}_1$ is as follows.

$$\text{Var}(\hat{\beta}_1) = E\left[\{\hat{\beta}_1 - E[\hat{\beta}_1]\}^2\right] \quad (6.5)$$

$$= E\left[\{\hat{\beta}_1 - \beta_1\}^2\right] \text{ since } E[\hat{\beta}_1] = \beta_1$$

Referring to Equation (6.1), it may be expressed as follows.

$$(\hat{\beta}_1 - \beta_2)^2 = \left(\sum_{i=1}^{N} k_i \epsilon_i\right)^2 = \sum_{i=1}^{N} k_i^2 \epsilon_i^2 + 2\sum_{i=1}^{N-1}\sum_{j=i+1}^{N} k_i k_j \epsilon_i \epsilon_j \quad (6.6)$$

Therefore, it may be expressed as follows.

$$E\left[\{\hat{\beta}_1 - \beta_1\}^2\right] = E\left[\sum_{i=1}^{N} k_i^2 \epsilon_i^2 + 2\sum_{i=1}^{N-1}\sum_{j=i+1}^{N} k_i k_j \epsilon_i \epsilon_j\right] \quad (6.7)$$

$$= \sum_{i=1}^{N} k_i^2 E[\epsilon_i^2 \mid X_i] + 2\sum_{i=1}^{N-1}\sum_{j=i+1}^{N} k_i k_j E[\epsilon_i \epsilon_j \mid X_i X_j]$$

$$= \sum_{i=1}^{N} k_i^2 E[\epsilon_i^2 \mid X_i] \text{ since } E[\epsilon_i \epsilon_j \mid X_i X_j] = 0 \text{ by assumption}$$

$$= \sum_{i=1}^{N} k_i^2 \cdot \sigma^2$$

$$= \sigma^2 \sum_{i=1}^{N} k_i^2 \text{ since } E[\epsilon_i^2 \mid X_i] = \sigma^2 \text{ by assumption}$$

$$\sum_{i=1}^{N} k_i^2 = \frac{1}{\left\{\sum_{i=1}^{N} X_i \cdot \sinh(\phi_i)\right\}^2} \sum_{i=1}^{N} \{\sinh(\phi_i)\}^2 \quad (6.8)$$

$$\sum_{i=1}^{N}\{\sinh(\phi_i)\}^2 = \sum_{i=1}^{N}\frac{1}{2}\{\cosh(2\cdot\phi_i)-1\} \quad (6.9)$$

$$= \frac{1}{2}\sum_{i=1}^{N}\cosh(2\cdot\phi_i) - \frac{N}{2}$$

$$= \frac{N}{2}\left\{\frac{1}{N}\sum_{i=1}^{N}\cosh(2\cdot\phi_i) - 1\right\}$$

$$\sum_{i=1}^{N}\{\sinh(\phi_i)\}^2 = \frac{N}{2}(T-1) \quad (6.10)$$

where $T = \frac{1}{N}\sum_{i=1}^{N}\cosh(2\cdot\phi_i)$ $$\sum_{i=1}^{N}X_i\cdot\sinh(\phi_i) = \sum_{i=1}^{N}c\cdot\tanh(\theta_i)\cdot\sinh(\theta_i-\theta_0) \quad (6.11)$$

$$= c\sum_{i=1}^{N}\tanh(\theta_i)\{\sinh(\theta_i)\cosh(\theta_0) - \cosh(\theta_i)\sinh(\theta_0)\}$$

$$= c\sum_{i=1}^{N}\left\{\frac{\sinh(\theta_i)}{\cosh(\theta_i)}\cdot\sinh(\theta_i)\cosh(\theta_0) - \frac{\sinh(\theta_i)}{\cosh(\theta_i)}\cdot\cosh(\theta_i)\sinh(\theta_0)\right\}$$

$$= c\sum_{i=1}^{N}\left\{\cosh(\theta_0)\frac{\sinh^2(\theta_i)}{\cosh(\theta_i)} - \sinh(\theta_0)\sinh(\theta_i)\right\}$$

$$= c\sum_{i=1}^{N}\left[\cosh(\theta_0)\left\{\cosh(\theta_i) - \frac{1}{\cosh(\theta_i)}\right\} - \sinh(\theta_0)\sinh(\theta_i)\right]$$

$$= c\left[\cosh(\theta_0)\left\{\sum_{i=1}^{N}\cosh(\theta_i) - \sum_{i=1}^{N}\frac{1}{\cosh(\theta_i)}\right\} - \sinh(\theta_0)\sum_{i=1}^{N}\sinh(\theta_i)\right]$$

Let's say, $$C = \frac{1}{N}\sum_{i=1}^{N}\cosh(\theta_i), \quad (6.12)$$

$$S = \frac{1}{N}\sum_{i=1}^{N}\sinh(\theta_i), \text{ and}$$

$$H = \frac{N}{\sum_{i=1}^{N}\frac{1}{\cosh(\theta_i)}}.$$

$$\tanh(\theta_0) = \frac{S}{C}$$

$$\cosh(\theta_0) = \frac{1}{\sqrt{1-\tan^2(\theta_0)}} = \frac{1}{\sqrt{1-\frac{S^2}{C^2}}} = \frac{C}{\sqrt{S^2-C^2}} \quad (6.13)$$

$$\sinh(\theta_0) = \tanh(\theta_0)\cdot\cosh(\theta_0) = \frac{S}{\sqrt{S^2-C^2}} \quad (6.14)$$

$$\sum_{i=1}^{N}\frac{1}{\cosh(\theta_i)} = \frac{N}{H} \quad (6.15)$$

$$\sum_{i=1}^{N}X_i\cdot\sinh(\phi_i) = c\left[\frac{C}{\sqrt{S^2-C^2}}\left\{N\cdot C - \frac{N}{H}\right\} - \frac{S2}{\sqrt{S^2-C^2}}\cdot N\cdot S\right] \quad (6.16)$$

$$= \frac{c\cdot N}{\sqrt{S^2-C^2}}\left[C^2 - S^2 - \frac{C}{H}\right]$$

Therefore, it may be expressed as follows.

$$\text{Var}(\hat{\beta}_1) = \sigma^2\frac{N(T-1)}{2}\frac{S^2-C^2}{c^2\cdot N^2\left(C^2-S^2-\frac{C}{H}\right)^2} = \frac{(S^2-C^2)(T-1)}{2c^2\cdot N\left(C^2-S^2-\frac{C}{H}\right)^2}\sigma^2 \quad (6.17)$$

The variance of $\hat{\beta}_0$ is as follows.

$$\text{Var}(\hat{\beta}_0) = \text{Var}(\overline{Y} - \hat{\beta}_1\cdot\overline{X}) \quad (6.21)$$

$$= \text{Var}(\overline{Y}) + \overline{X}^2\text{Var}(\hat{\beta}_1)$$

$$= \text{Var}\left(\frac{1}{N}\sum_{i=1}^{N}(\beta_0 + \beta_1\cdot X_i + \epsilon_i)\right) + \overline{X}^2\text{Var}(\hat{\beta}_1)$$

$$= \frac{1}{N^2}\cdot N\cdot\sigma^2 + \overline{X}^2\text{Var}(\hat{\beta}_1)$$

$$= \frac{1}{N}\left(1 + \frac{(S^2-C^2)(T-1)\overline{X}^2}{2c^2\left(C^2-S^2-\frac{C}{H}\right)^2}\right)\sigma^2$$

6.4. Covariance Between $\hat{\beta}_1$ and $\hat{\beta}_0$

The covariance between $\hat{\beta}_1$ and $\hat{\beta}_0$ is as follows.

$$\text{Cov}(\hat{\beta}_0, \hat{\beta}_1) = E[(\hat{\beta}_0 - E[\hat{\beta}_0])(\hat{\beta}_1 - E[\hat{\beta}_1])] \quad (6.22)$$

$$= E[\{(\overline{Y} - \hat{\beta}_1\overline{X}) - E[\hat{\beta}_0]\}(\hat{\beta}_1 - E[\hat{\beta}_1])]$$

from equation (5.9)

$$= E[\{(\overline{Y} - \hat{\beta}_1\overline{X}) - (\overline{Y} - \beta_1\overline{X})\}(\hat{\beta}_1 - E[\hat{\beta}_1])]$$

(since $E[\hat{\beta}_0] = \overline{Y} - E[\hat{\beta}_1]\overline{X} = \overline{Y} - \beta_1\overline{X}$)

$$= E[\{(\overline{Y} - \hat{\beta}_1\overline{X}) - (\overline{Y} - \beta_1\overline{X})\}(\hat{\beta}_1 - \beta_1)]$$

from equation (6.2)

$$= E[-\overline{X}\cdot(\hat{\beta}_1 - \beta_1)^2]$$

$$= -\overline{X}\cdot E[(\hat{\beta}_1 - \beta_1)^2]$$

$$= -\overline{X}\cdot\text{Var}(\hat{\beta}_1)$$

7. SUMMARY AND CONCLUSIONS

The problem that occurs when OLS is used to estimate a linear regression parameter in a case where independent variables are bounded to the open interval (−c,c) in a special relativity environment has been described. It has been found that an OLS estimator for a slope parameter does not change under the Lorentz velocity transformation.

As an alternative estimator for the parameter of the linear regression under special relativity, there has been proposed an estimator that does not change in the Lorentz velocity transformation. The proposed estimator is an unbiased estimator and converges to the OLS estimator when c approaches infinity. When c approaches infinity, the variance of the proposed estimator also converges to the variance of the OLS estimator. Therefore, when the range of independent variables is bounded to the open interval, the proposed estimator may be regarded as a generalization of the OLS estimator.

The variance of the proposed estimator is greater than that of the OLS estimator. This implies that the uncertainty is greater when the range of independent variables is bounded. Since the confidence interval composed of the OLS estimator and the variance of the OLS estimator is narrower than the confidence interval composed of the proposed estimator, if the range of independent variables is bounded in a hypothesis test that uses the OLS estimator and the variance of the OLS estimator, it is found that a liberal test could occur.

Meanwhile, the present disclosure has specifically described a parameter estimating method based on correction of independence of an error term, a computer program for implementing the method, and a system configured to perform the method, the method which is capable of statistically estimating a measurement unit of a speedometer and accuracy thereof, the speedometer which has an error and measures a velocity of an object in an unknown measurement unit under the special theory of relativity. However, aspects of the present disclosure are not necessarily limited thereto, and of course, it is possible to effectively apply the present disclosure even to a different type of data that corresponds to the relationship between an actual velocity and a measured velocity with an error of an unknown measurement unit under the special theory of relativity.

The disclosed technology may have the following effects. However, since a specific embodiment may provide all the following effects or only a few of them, the scope of the disclosure is not limited to the following advantages.

A parameter estimating method based on correction of independence of an error term according to an embodiment of the present disclosure, a computer program for implementing the method, and a system configured to perform the method can solve the problem that when the measurement unit of the speedometer is estimated by the least square method based on a linear regression model, an estimated value of the measurement unit and a variance of the estimate (accordingly, the confidence interval and statistical significance of the estimate) vary depending on a velocity of a measuring person.

A parameter estimating method based on correction of independence of an error term according to an embodiment of the present disclosure, a computer program for implementing the method, and a system configured to perform the method can make it possible to estimate a parameter using an independence relationship between a momentum of an object measured at the relativistic center of momentum and an error term, so that the estimated value of the measurement unit and the variance of the estimate (accordingly, the confidence interval and statistical significance of the estimate) can be acquired regardless of a velocity of a measuring person.

A parameter estimating method based on correction of independence of an error term according to an embodiment of the present disclosure, a computer program for implementing the method, and a system configured to perform the method can be effectively applied even to other data having the relationship between a measured velocity with an error of an unknown measurement unit under the special theory of relativity and an actual velocity.

While the present disclosure has been shown and described with reference to preferred embodiments thereof, it will be understood by those skilled in the art that various changes in form and details may be made therein without departing from the spirit and scope of the present disclosure as defined by the appended claims.

What is claimed is:

1. A parameter estimating method based on correction of independence of an error term, the method comprising:
   acquiring a measured velocity, which is a velocity of a moving object measured with a speedometer being operated by an observer and having a specific measurement unit, and an actual velocity of the moving object with respect to the observer;
   performing modeling of a linear regression model with the measured velocity as a dependent variable and the actual velocity of the moving object with respect to the observer as an independent variable; and
   estimating parameters of a linear regression equation after correcting the independence of the error term based on Lorentz velocity transformation,
   wherein the actual velocity comprises a velocity of the moving object measured with a second speedometer having a negligible error, and
   wherein the acquiring of the measured velocity comprises measuring the measured velocity of the moving object with the speedometer that has an unknown measurement unit as the specific measurement unit and has an error in velocity measurement, the error excluding the negligible error.

2. The method of claim 1, wherein the estimating of the parameters comprises specifying the independence of the error term with respect to a population regression equation defined by Equation 1 below as the linear regression equation:

$$Y_i = \beta_0 + \beta_1 \cdot X_i + \epsilon_i \quad \text{[Equation 1]}$$

where $Y_i$ denotes a velocity of moving object i measured with the speedometer, $X_i$ denotes an actual velocity of the moving object i or a velocity of the moving object i measured with the second speedometer having the negligible error, $\beta_0$ denotes actual accuracy or a systematic error of the speedometer, $\beta_1$ denotes an actual measurement unit of the speedometer, $\epsilon i$ denotes an error term that follows a normal distribution with zero mean and unknown variance $\sigma^2$, denoted as $N(0,\sigma^2)$, and $\sigma$ is a standard deviation of the normal distribution.

3. The method of claim 1, wherein the estimating of the parameters comprises setting the independent variable to be bounded to an open interval $(-c, c)$ (where c is any positive finite value).

4. The method of claim 1, wherein the estimating of the parameters comprises correcting the independence of the error term to $E[\epsilon i \cdot f(\phi i)] = 0$ by setting every moving object of a plurality of moving objects to have same rest mass in the Lorentz velocity transformation and then applying rapidity $\phi i$ of a moving object measured at a relativistic center of momentum, where εi denotes an error term that follows a normal distribution with zero mean and unknown variance $\sigma^2$, denoted as $N(0,\sigma^2)$, and σ is a standard deviation of the normal distribution.

5. The method of claim 4, wherein the estimating of the parameters comprises deriving $E[\varepsilon i]=0$ and $E[\varepsilon i \cdot \sinh(\phi i)]=0$ as a population moment condition based on the corrected independence of the error term, and estimating the parameters of the linear regression equation using the linear regression equation and the derived population moment condition.

6. The method of claim 5, wherein the estimating of the parameters comprises estimating the parameters of the linear regression equation after deriving a sample regression equation and a sample moment condition, which correspond to the linear regression equation and the derived population moment condition.

7. The method of claim 6, wherein the estimating of the parameters comprises estimating accuracy and measurement unit of the speedometer as the parameters of the linear regression equation through Equation 2 below:

$$\hat{\beta}_0 = \overline{Y} - \hat{\beta}_1 \cdot \overline{X} = \overline{Y} - \frac{\sum_{i=1}^{N} Y_i \cdot \sinh(\phi_i)}{\sum_{i=1}^{N} X_i \cdot \sinh(\phi_i)} \cdot \overline{X} \quad \text{[Equation 2]}$$

$$\hat{\beta}_1 = \frac{\sum_{i=1}^{N} Y_i \cdot \sinh(\phi_i)}{\sum_{i=1}^{N} X_i \cdot \sinh(\phi_i)}$$

where $\hat{\beta}_0$ denotes an estimated accuracy of the speedometer, $\hat{\beta}_1$ denotes an estimated measurement unit of the speedometer, $Y_i$ denotes a velocity of moving object i measured with the speedometer, $X_i$ denotes an actual velocity of the moving object i or a velocity of the moving object i measured with the second speedometer having the negligible error, c is any positive finite value, $$\overline{X} = \frac{1}{N}\sum_{i=1}^{N} X_i,$$

$$\overline{Y} = \frac{1}{N}\sum_{i=1}^{N} Y_i,$$

$$\phi_i = \theta_i - \theta_0,$$

$$\theta_i = \tanh^{-1}\left(\frac{X_i}{c}\right),$$

$$(\theta_0) = \tanh^{-1}\left(\frac{\sum_{i=1}^{N}\sinh(\theta_i)}{\sum_{i=1}^{N}\cosh(\theta_i)}\right),$$

$$\tanh(\theta_0) = \frac{\sum_{i=1}^{N}\sinh(\theta_i)}{\sum_{i=1}^{N}\cosh(\theta_i)},$$

N is a number of the moving objects being measured, $\theta_i$ is an actual rapidity of the moving object i measured by the observer, $\theta_0$ is the rapidity of the relativistic center of momentum of the N moving objects being measured, and $\tanh^{-1}(x)$ stands for inverse of hyperbolic tangent function $\tanh(x)$.

8. The method of claim 7, wherein the estimating of the parameters comprises, based on the estimated parameters of the linear regression equation, estimating variances and a covariance for corresponding parameters.

9. The method of claim 8, wherein the estimating of the parameters comprises, based on the estimated parameters of the linear regression equation, estimating respective variances for the corresponding parameters through Equation 3 below:

$$\text{Var}(\hat{\beta}_0) = \text{Var}(\overline{Y} - \hat{\beta}_1 \cdot \overline{X}) \quad \text{[Equation 3]}$$

$$= \text{Var}(\overline{Y}) + \overline{X}^2 \text{Var}(\hat{\beta}_1)$$

$$= \text{Var}\left(\frac{1}{N}\sum_{i=1}^{N}(\beta_0 + \beta_1 \cdot X_i + \epsilon_i)\right) + \overline{X}^2 \text{Var}(\hat{\beta}_1)$$

$$= \frac{1}{N^2} \cdot N \cdot \sigma^2 + \overline{X}^2 \text{Var}(\hat{\beta}_1)$$

$$= \frac{1}{N}\left(1 + \frac{(S^2 - C^2)(T-1)\overline{X}^2}{2c^2\left(C^2 - S^2 - \frac{C}{H}\right)^2}\right)\sigma^2$$

$$\text{Var}(\hat{\beta}_1) = \sigma^2 \frac{N(T-1)}{2} \frac{S^2 - C^2}{c^2 \cdot N^2\left(C^2 - S^2 - \frac{C}{H}\right)^2} = \frac{(S^2 - C^2)(T-1)}{2c^2 \cdot N\left(C^2 - S^2 - \frac{C}{H}\right)^2}\sigma^2$$

where $\text{Var}(\hat{\beta}_0)$ denotes a variance for $\hat{\beta}_0$, $\text{Var}(\hat{\beta}_1)$ denotes a variance for $\hat{\beta}_1$, $\beta_0$ denotes actual accuracy or a systematic error of the speedometer, $\beta_1$ denotes an actual measurement unit of the speedometer, $$S = \frac{1}{N}\sum_{i=1}^{N}\sinh(\theta_i),$$

$$C = \frac{1}{N}\sum_{i=1}^{N}\cosh(\theta_i)$$

$$T = \frac{1}{N}\sum_{i=1}^{N}\cosh(2 \cdot \phi_i),$$

$$H = \frac{N}{\sum_{i=1}^{N}\frac{1}{\cosh(\theta_i)}}$$

$$\sigma^2 = \frac{1}{N-2}\sum_{i=1}^{N}\hat{\varepsilon}_1^2, \text{ and}$$

$$\hat{\varepsilon}_1 = Y_i - \hat{\beta}_1 \cdot X_i - \hat{\beta}_0.$$

10. The method of claim 8, wherein the estimating of the parameters comprises, based on the estimated parameters of the linear regression equation, estimating the covariance between the corresponding parameters through Equation 4 below:

$$\begin{aligned}\text{Cov}(\hat{\beta}_0, \hat{\beta}_1) &= E\left[(\hat{\beta}_0 - E[\hat{\beta}_0])(\hat{\beta}_1 - E[\hat{\beta}_1])\right] \quad &[\text{Equation 4}]\\ &= E\left[\{(\overline{Y} - \hat{\beta}_1\overline{X}) - E[\hat{\beta}_0]\}(\hat{\beta}_1 - E[\hat{\beta}_1])\right]\\ &= E\left[\{(\overline{Y} - \hat{\beta}_1\overline{X}) - (\overline{Y} - \beta_1\overline{X})\}(\hat{\beta}_1 - E[\hat{\beta}_1])\right]\\ &= E\left[\{(\overline{Y} - \hat{\beta}_1\overline{X}) - (\overline{Y} - \beta_1\overline{X})\}(\hat{\beta}_1 - \beta_1)\right]\\ &= E\left[-\overline{X} \cdot (\hat{\beta}_1 - \beta_1)^2\right]\\ &= -\overline{X} \cdot E\left[(\hat{\beta}_1 - \beta_1)^2\right]\\ &= -\overline{X} \cdot \text{Var}(\hat{\beta}_1)\end{aligned}$$

where $\text{Cov}(\hat{\beta}_0, \hat{\beta}_1)$ denotes a covariance between $\hat{\beta}_0$ and $\hat{\beta}_1$, $\beta_0$ denotes actual accuracy or a systematic error of the speedometer, and $\beta_1$ denotes an actual measurement unit of the speedometer.

11. A parameter estimating system based on correction of independence of an error term, the system comprising:
- a moving object velocity acquiring unit configured to acquire a measured velocity, which is a velocity of a moving object measured with a speedometer being operated by an observer and having a specific measurement unit, and an actual velocity of the moving object with respect to the observer;
- a modeling unit configured to perform modeling of a linear regression model with the measured velocity as a dependent variable and the actual velocity of the moving object with respect to the observer as an independent variable; and
- a parameter estimating unit configured to estimate parameters of a linear regression equation after correcting the independence of the error term based on Lorentz velocity transformation, wherein the actual velocity comprises a velocity of the moving object measured with a second speedometer having a negligible error, wherein the acquiring of the measured velocity comprises measuring the measured velocity of the moving object with the speedometer that has an unknown measurement unit as the specific measurement unit and has an error in velocity measurement, the error excluding the negligible error, and wherein the moving object velocity acquiring unit, the modeling unit, and the parameter estimating unit are each implemented via at least one processor.

12. A non-transitory computer-readable medium having embodied thereon a program, which when executed by a computer causes the computer to execute a parameter estimating method based on correction of independence of an error term, the method comprising:
- acquiring a measured velocity, which is a velocity of a moving object measured with a speedometer being operated by an observer and having a specific measurement unit, and an actual velocity of the moving object with respect to the observer;
- performing modeling of a linear regression model with the measured velocity as a dependent variable and the actual velocity of the moving object with respect to the observer as an independent variable; and
- estimating parameters of a linear regression equation after correcting the independence of the error term based on Lorentz velocity transformation, wherein the actual velocity comprises a velocity of the moving object measured with a second speedometer having a negligible error, and wherein the acquiring of the measured velocity comprises measuring the measured velocity of the moving object with the speedometer that has an unknown measurement unit as the specific measurement unit and has an error in velocity measurement, the error excluding the negligible error.

\* \* \* \* \*